US008506375B2

(12) United States Patent
Ward

(10) Patent No.: US 8,506,375 B2
(45) Date of Patent: Aug. 13, 2013

(54) COMMUNITY CARD POKER GAME

(75) Inventor: Kenneth Ward, Willoughby, OH (US)

(73) Assignees: Kenneth Ward, Willoughby, OH (US); Gregory Turocy, Moreland Hills, OH (US)

( * ) Notice: Subject to any disclaimer, the term of this patent is extended or adjusted under 35 U.S.C. 154(b) by 0 days.

(21) Appl. No.: 13/225,323

(22) Filed: Sep. 2, 2011

(65) Prior Publication Data

US 2013/0059644 A1 Mar. 7, 2013

(51) Int. Cl.
*A63F 9/24* (2006.01)
*A63F 13/00* (2006.01)

(52) U.S. Cl.
USPC .................. 463/13; 463/16; 463/17; 463/18; 463/19; 463/20

(58) Field of Classification Search
USPC ................................................ 463/13, 16–20
See application file for complete search history.

(56) References Cited

U.S. PATENT DOCUMENTS 6,554,702 B2 4/2003 Mahar et al.
6,955,599 B2 10/2005 Bourbour et al.
7,758,411 B2 7/2010 Crawford, III et al.
2003/0157979 A1* 8/2003 Cannon et al. .................. 463/16
2004/0262844 A1 12/2004 Manzo et al.
2006/0234796 A1* 10/2006 Nobrega et al. ................. 463/42
2008/0318651 A1 12/2008 Gross et al.
2009/0029773 A1* 1/2009 Cherry ............................ 463/42

OTHER PUBLICATIONS

International Search Report and Written Opinion mailed Jan. 4, 2013 for PCT Application Serial No. PCT/US12/53323, 13 pages.

* cited by examiner

*Primary Examiner* — Arthur O. Hall
*Assistant Examiner* — Jasson Yoo
(74) *Attorney, Agent, or Firm* — Turocy & Watson, LLP

(57) ABSTRACT

Systems and methods are provided to facilitate a player re-entering a card game, even though they may have "folded" their hand on a previous turn in the card game. Conventionally, in traditional forms of community card poker games, once a player has folded their hand they are unable to take part in the game currently being played. Rather than folding their hand, a player can "hold" their hand with the possibility of returning to the game. By enabling a buy-back-in feature a player can re-enter the game to continue betting, etc. Further the sequence of game play can be altered compared with the conventional play. The card game can be played in a physical environment as well as a digital environment.

20 Claims, 12 Drawing Sheets

COMMUNITY CARD POKER GAME

TECHNICAL FIELD

Embodiments described herein relate generally to card games, methods of playing card games, on-line card games, video game console card games, card games for mobile devices and in particular to a community card poker game.

BACKGROUND

Casino-type games and other forms of entertainment that combine chance with skill have achieved significant popularity, both in the technological and traditional realm. Traditionally, poker is played at a table with several players wagering paper money, coin money or other form of wagers on a series of playing cards. This form of poker requires a human dealer to coordinate the game. In today's expanding technological market, arcade games and other electronic devices have become exceedingly popular. As electronic games have increased in popularity, more casino-type games, such as poker, are enjoyed in electronic format.

Internet gaming has become quite successful in that it provides many choices for the players. In particular, Internet gaming is fast and convenient, with registration, betting and payouts available from almost any computer, including but not limited to hand held devices such as cellular phones, with Internet access. Poker or other card games may also be provided by stand-alone machines similar to slot machines. Electronic card games, such as electronic poker games, have been provided which allow players to compete against one another, but eliminate the dealer and the physical cards. Other electronic devices allow players to compete against other players without wagering actual currency.

In concept, video poker is enjoyed similarly to traditional poker games and is designed to replicate many aspects of a traditional poker. In some formats, the player is not attempting to beat another player's hand or a dealer's hand, the player is simply attempting to achieve the highest ranking poker hand possible from the cards displayed to the player.

In "flop" type poker games (also known as community card poker games), such as Texas Hold'em Poker and Omaha Poker, each player's hand may consist of a number of cards (pocket cards) unique to the player, and one or more common cards (community cards) which are shared among players. Players must make a betting decision before one or more of the community cards are exposed. A brief description of the background art including standard play for a Texas Hold'em Poker Game will now be provided but there are a variety of versions of the game, all of which have a similar format and general rules described below.

Poker is often played in a series of games or hands. In a game or hand, each player is dealt a number of cards (often referred to as a player's hand). The players place wagers in a pot based on their individual hands. The players' hands are evaluated and the winning player(s) receives the pot. Typically, players will play a series of games or hands.

A game, or series of games, is either "no limit" or "limit" type. A no limit type means each player may bet as much currency as they wish. A limit type means that bets have a maximum or minimum amount (e.g. pot limit poker limits the amount a player can bet to the amount of money in the pot).

Before cards are dealt in a game of Texas Hold'em, initial bets may be required. Two common ways to place these initial bets are antes and forced bets (blinds). An ante is a set amount put in the pot by every player in the game prior to the cards being dealt. This amount does not count toward the bet on the first round of betting. It is not very common to use antes with Texas Hold'em. Antes can also be used in conjunction with blinds, e.g., tournament sessions.

Blinds are another form of pre-flop bets. Before the cards are dealt, the first player to the left of the dealer must put forth the "small blind" and the second player to the left of the dealer must put forth the "big blind". These blind placements count toward the total investment in the first round of betting. The amount of each blind is predetermined before each hand is dealt and is typically constant for the entire session or increased upon fulfillment of an event, such as a player being eliminated. The small blind is typically one half of the big blind.

Two cards are dealt to each of a group of players after the blinds or antes, if any, are placed. These cards are called hole or pocket cards. In an ante or no pre-flop bet game, the betting begins with the first player to the left of the dealer. In a blind game, the person to the left of the big blind starts the round of betting. This round is known as the pre-flop betting. Three cards are placed face up on the table after the pre-flop bets are placed. These are the first three community cards and are collectively referred to as the flop. The first player to the left of the dealer starts this round of betting. After all bets are placed for the flop round, one more card is placed face up on the table. This is known as the turn or fourth street. Another round of betting begins with the player to the left of the dealer. After this round of betting, a final card is placed face up on the table. This is known as the river or fifth street. A final round of betting takes place beginning with the player to the left of the dealer. All bets are placed into a jackpot, the "pot". After betting is finished all cards are shown and payouts and collections are resolved according to the ranking of the poker hands of each player.

The players use a combination of their pocket cards and the community cards to form a poker hand. The player who shows the best hand wins. In some cases players with equal hands share the pot. In some cases the best hand is made up of the five community cards and the players share the pot.

If a game concludes before all the community cards are exposed, the players occasionally ask the dealer to expose one or more of the undealt community cards. This is commonly referred to as "rabbit hunting". This is desirable, from the player's perspective, because it allows them to see if they made the right decision.

When a player bets all the currency that they have, this is called going all-in. If a player goes all-in and does not have enough money to match the current bet, then a side pot is typically created. If the all-in player wins the hand he is only entitled to his stake of the total pot. Players who continue betting or have a greater stake will be entitled to the side pot. For example, with three players in a game, a first player, with a large stack, wagers $20. A second player who only has $10 calls the $10, going all-in. A third player has $30, and thus can either call the full $20, re-raise to $30, or fold. If the third player bets all $30, going all-in, the bet is now $10 to the first player, who calls. Because the second player can only win $10 from each of the other two players' $30 bets, that $10 is taken from all players' bets and the $30 total is placed in the main pot. The $40 remaining, for which the first and third players are separately contesting, goes in a "side pot". As no further bets can be made, the hand is now dealt to completion. If the second player has the best hand overall, then they win the main pot. If the third player has the second-best hand, then they win the side pot.

One drawback of community card poker games like Texas Hold'em is that the games may entail extended periods of inactivity. Because only two players are forced to bet in any hand (when blinds are used), the other players are able to examine and discard their poor cards without incurring a loss. Once a player folds, the player is excluded from further betting. At this point, the player is isolated and may become bored. As the community cards are flopped, the player may wish that they had remained in the game. As a result, often a player will not participate in the game for long periods until two favorable cards are received. Players that prefer the action and immediate decision of other games frequently choose not to exercise the patience and devote the time required to play Texas Hold'em and other community card poker games. Another problem with Texas Hold'em and other community card poker games is that the winning hand is usually a low value poker hand, typically two pair when there are five players. Should one player have a high hand at an early stage in the deal (e.g., after dealing the pocket cards) he can bet very high to force the other players out of the game.

In addition to Texas Hold'em poker, there are number of poker games which focus on community cards which players can combine with personal cards to form a poker hand. The following are variants of Texas Hold'em poker game:

"Omaha"—Players are dealt four pocket cards instead of two pocket cards. The players must use exactly two of their pocket cards in combination with three of the five community cards to make a five card hand.

"Pineapple"—Players are dealt three pocket cards and immediately discard one of the three pocket cards face-down before pre-flop betting begins.

"Crazy Pineapple"—Players are dealt three pocket cards. Before the turn card is dealt (after the post-flop betting), each player discards one of the three pocket cards face-down. If a player does not discard a card, his or her hand is dead after the turn is dealt.

"Double Flop Hold'em"—Whenever community cards are dealt there are two different boards dealt. Players can use their two cards in combination with either of these two separate boards.

"Super Hold'em"—Players are dealt three pocket cards. Players may use all 3 pocket cards in combination with 5 community cards to form a five card poker hand.

"Tahoe Poker"—Players are dealt three pocket cards. Players must use exactly 2 of their pocket cards in combination with 5 community cards to form a five card poker hand.

"Chowaha"—Players are dealt two pocket cards but there are three flop cards (all dealt at the same time), two turn cards (dealt at once), and one river card. Players form combinations of boards using their pocket cards and specific board lines, of which there are four. The top flop can't be used with the bottom turn and the bottom flop can't be used with the top turn.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

During betting of a game of poker, a player(s) may fold their respective pocket cards. Typically, the player(s) cannot place any bets after folding and must await a new game before resuming play. In an exemplary, non-limiting embodiment, the player(s) retain (hold) their respective pocket cards and re-enter or buy-back-in the game by paying a premium amount. In an aspect, the concept of folding ones hand but sitting out with the possibility of buying-back-in can be considered to be the player is "holding" their cards, as opposed to folding where the player is further excluded from play in a traditional game. This adds significant excitement and greatly increases the strategy of the game in comparison with a traditional game. In an exemplary, non-limiting embodiment the premium will be at least the size of the pot. In another exemplary, non-limiting embodiment, the premium may have an adjustable rate depending on the stage of the game.

In another aspect, a player(s) can have limited opportunities to view their respective pocket cards. If, for example, a player looks at his cards more than one time he may be penalized, where such imposed penalty can be of any degree suitable to the game, for example a fine can be imposed, hand becomes dead, etc.

In a further exemplary, non-limiting embodiment, the sequence of betting can be different to that encountered in traditional game play. A sequence of dealer→big blind→little blind can be followed.

With the disclosed aspects presented herein, the present system can be implemented using a physical poker game environment such as a table, chairs, cards, players, and various rules which the players are exposed to during and prior to the game play. Further, the system can also be implemented through a software game application which generally utilizes, in some form, a game database, client computer, game application, various game objects. Furthermore, the software game application may even be implemented or hosted on a server which can be utilized to facilitate access of the application by a client(s) over closed or open networks, as required.

Additional variants of the various embodiments present herein can include implementation in formats which mix the physical poker game environment with the software application game.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
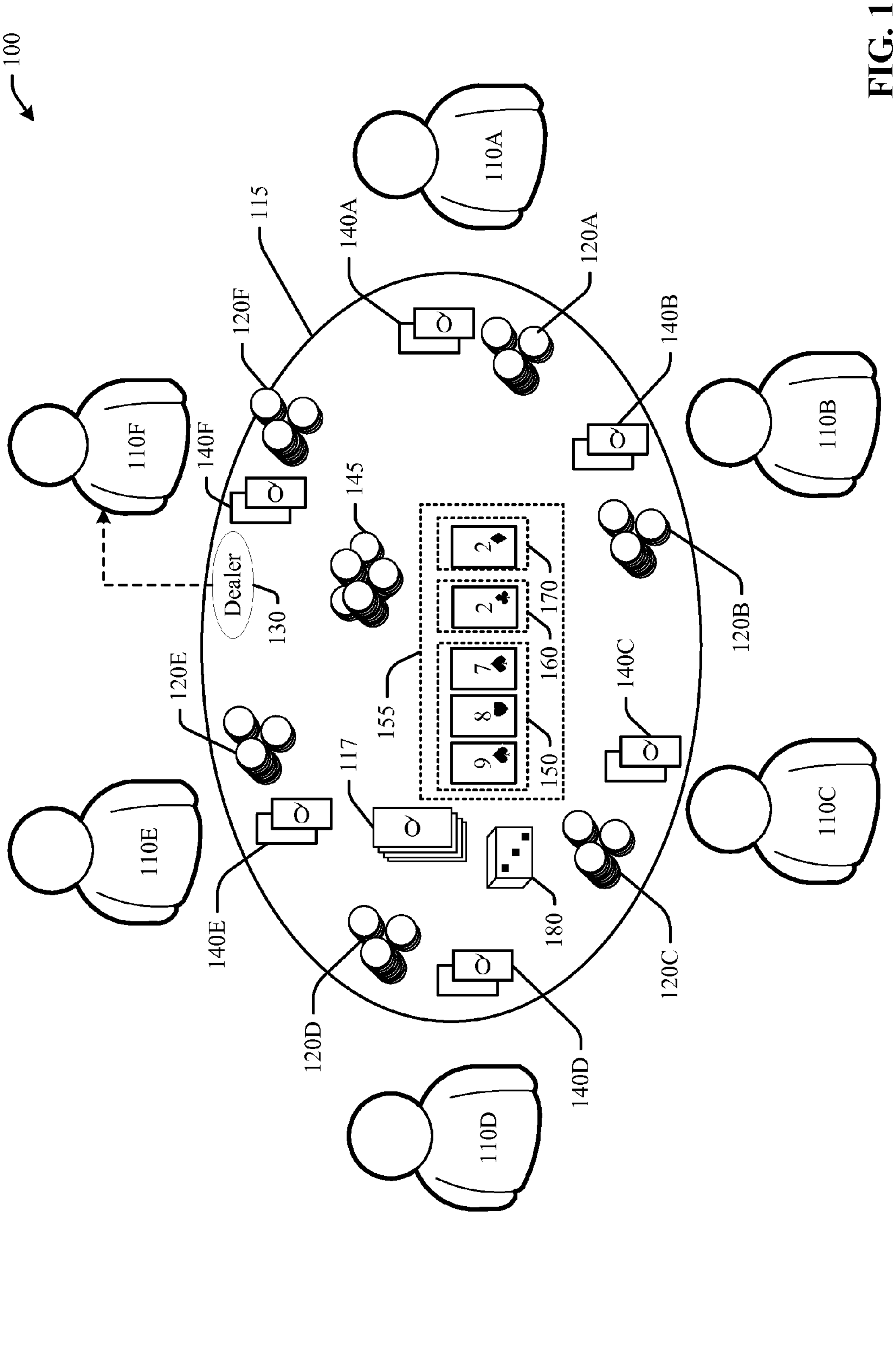
FIG. 1 is a block diagram illustrating an exemplary, non-limiting embodiment of a physical or traditional community card poker game.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a microprocessor, a microcontroller, a chip, an integrated circuit, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In describing the various non-limiting embodiments, discussion of the method of the present embodiment of the community card poker game play will be provided, followed by discussion of the implementation of the method on various systems.

Generally, a series of events comprising a deal, betting (if conducted), additional deals (if conducted), and determination of a winner is called a hand, a game, or a round. Likewise, a series of hands, games or rounds can be called a round, game, or session. It is to be noted that the terms may be used interchangeably throughout the description, such that, for the sake of readability, a game can mean a series comprising a deal, betting (if conducted), additional deals (if conducted), and determining a winner. Further, a plurality of successive games can be referred to as a session.

Likewise, the term pocket cards, hole cards or player's hand can be used interchangeably, however for readability, "pocket cards" will be utilized to describe a player's unique cards, while "hand" will be utilized in describing the status or state of the player's pocket cards.

Further, the term "the House" is used herein to describe an entity which hosts the gaming. For example, the House may be a casino, hotel, or an electronic device, such as a server. Furthermore, it is to be appreciated that while a no bet limited configuration is described for simplicity, other configurations may be used.

Generally, the exemplary, non-limiting embodiments described below relate to methods and systems of a community card poker. Accordingly a set of one or more players can participate in a community card poker game. Further, a player, of the set of players, can re-enter a hand after the player's respective pocket card(s) have been folded. The folded cards can be reentered if the player pays an amount to re-enter. In an aspect, the concept of folding ones hand but sitting out with the possibility of buying-back-in can be considered to be the player is "holding" their cards, as opposed to folding where the player is further excluded from play in a traditional game. In addition, a player of the set of players can view the players pocket cards a limited number of times. The player who exceeds this limit can be penalized.

The following are exemplary, non-limiting embodiments of systems and methods for a community card poker game.

FIG. 1 illustrates an exemplary, non-limiting embodiment of a conventional or physical game system 100, where, in addition to a conventional game play, players can buy-back-in at a premium and further, be limited to a number of views of their pocket cards, in accord with various aspects presented herein. For purposes of understanding operation of system 100 will be briefly described based upon conventional Texas Hold'em rules of gameplay. It is to be appreciated that, while Texas Hold'em is described owing to its popularity as a version of community card poker, the various aspects are not so limited. Numerous versions of community card poker exist and the various aspects presented herein can be applied to any version of community card poker. For example, in a game with Omaha Poker base rules, a player may fold his hand after receiving four pocket cards in and then buy-back-in after the dealing of the community cards.

System 100 can include a set of player(s), e.g., players 110A-E, seated around a table(s) 115. The table(s) 115 can support elements such as a deck of cards 117 and wagering a currency (depicted as each player's 110A-F individual currency 120A-F). Currency 120A-F is depicted as coins or poker chips, but it is to be understood and appreciated that currency 120 can be paper money, coin money, tokens, or other element(s) capable of representing value facilitating betting/wagering.

It is to be understood and appreciated that the number and type of card elements within a deck of cards 117 will depend on the size of the deck. A standard deck comprises 52 cards consisting of four suits: a hearts suit, a diamonds suit, a spades suit, and a clubs suit. Each suit comprises a two card, a three card, a four card, a five card, a six card, a seven card, an eight card, a nine card, a ten card, a Jack card, a Queen card, a King card, and an Ace card. The hearts suit and the diamonds suit are generally red and the clubs suit and the spades suit are generally black, although other colors or depictions can be used. Further, while the discussion pertains to a standard deck of 52 cards, comprising 4 suits, it is to be appreciated that other deck of cards can be utilized such as an Italian deck, a Spanish deck (Baraja), a Swiss deck, digital cards comprising Unicode, Hanfuda, and the like. Thus, it is understood and appreciated that any deck of cards capable of having an associated poker hand ranking can be utilized.

Typically, a dealer marker, or dealer button, 130 marks one player of the set of players as a dealer position, e.g., player 110 F is designated as the dealer position. The dealer position can be utilized to determine the order in which players perform actions, such as receive cards and place bets, for example. It is to be understood and appreciated that while a dealer marker 130 is illustrated for exemplary purposes, in other embodiments, a dealer marker 130 may not be utilized.

It is to be understood and appreciated that the player at the dealer position can perform dealer operations. Dealer operations can include dealing cards, collecting bets, and regulating game play. However, it is to be understood and appreciated that a player, other than the player at the dealer position, from the set of players or a non-player party can perform dealer operations. For the sake of readability the entity performing dealing operations is referred to as "the dealer", herein.

Upon commencement of a game, pocket cards 140 A-F are dealt to players 110 A-F, respectively, followed by players 110 A-F placing various amounts of currency ("wagers") in a pot 145. Pot 145 can be a designated area on table(s) 115. However, it is to be understood and appreciated that pot 145 can be in any area or in disparate locations, e.g., each player of the set of players 110A-F can place wagers in front of themselves. In another embodiment, pot 145 can be a representation of the amount each player of the set of players 110A-F has wagered, such as a calculating device or a computing component, for example.

As the game progresses, community cards 150, community card 160, and community card 170 are dealt at various times onto a board 155. Throughout the game, players 110A-F continue to place bet(s) until the game is resolved.

Figure 2:
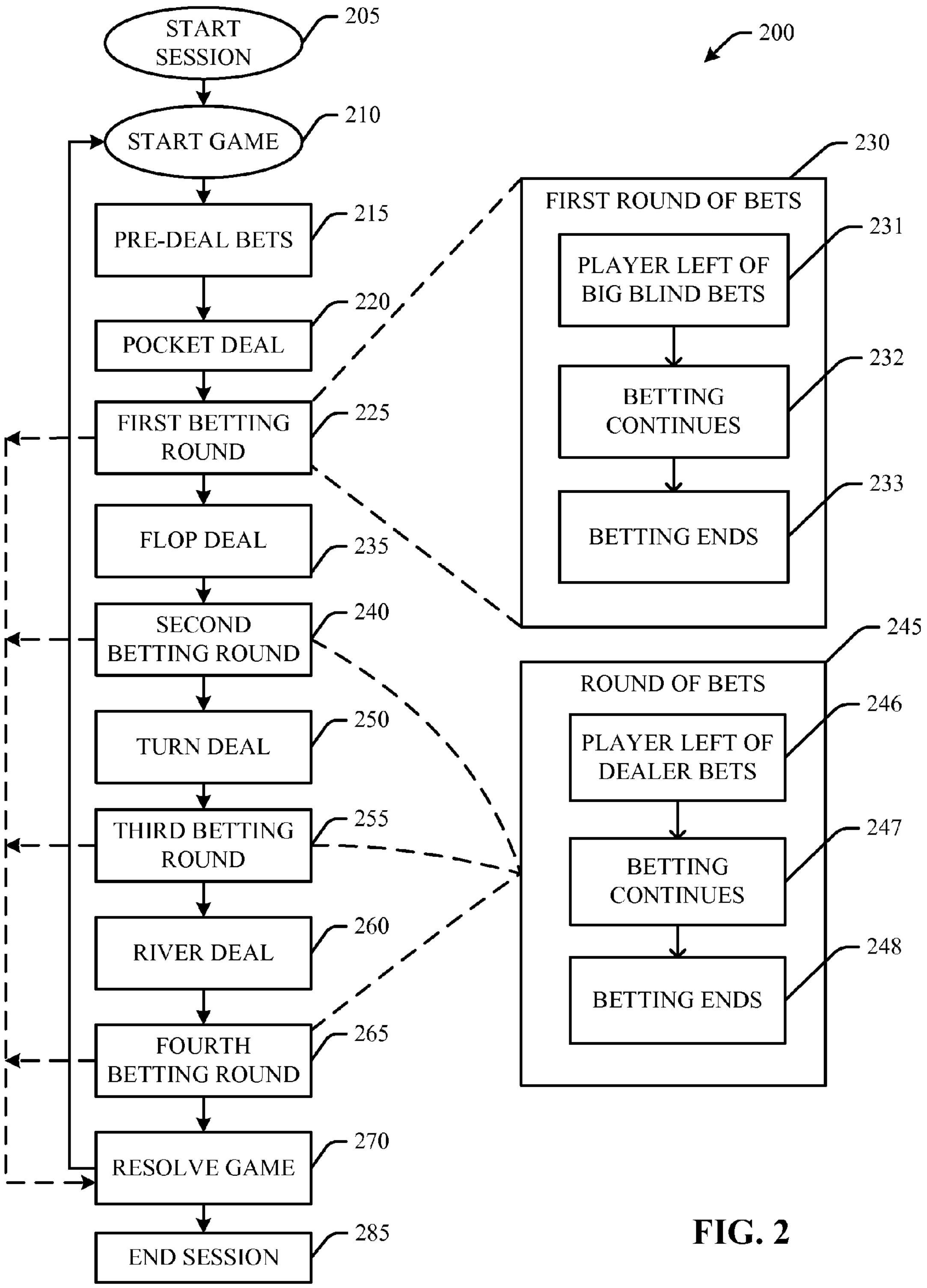
FIG. 2 is a flow diagram illustrating an exemplary, non-limiting embodiment involving card dealing and betting relating to a session of community card poker games.
Figure 3:
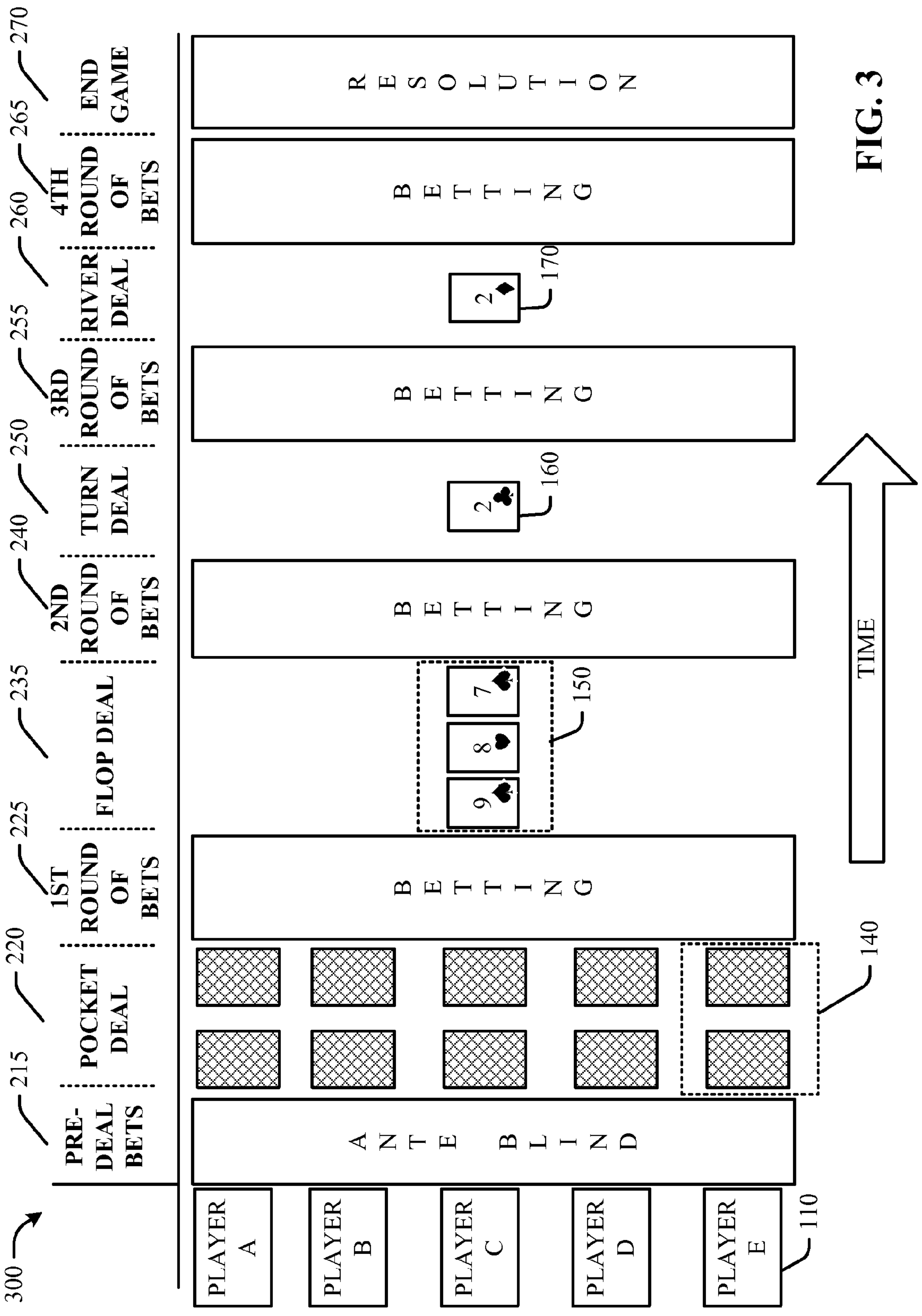
FIG. 3 is a flow diagram illustrating an exemplary, non-limiting embodiment of a game of community card poker.

Turning to FIGS. 2 and 3, an exemplary, non-limiting embodiment of game play based on Texas Hold'em is depicted, where FIGS. 2 and 3 are to be considered with reference to the various elements presented in FIG. 1.

FIG. 2 illustrates an exemplary, non-limiting embodiment of the game play based on a session of Texas Hold'em poker as a block diagram 200, comprising a game represented as blocks 210-270, followed by additional games (210-270). FIG. 3 illustrates an exemplary, non-limiting embodiment of a single game 300 in a pictorial view. It is to be understood and appreciated that sessions 200 and 300 can depict a tournament setting, wherein a plurality of sessions (205-285) can be performed at various tables, e.g., a plurality of tables 115, or can be performed via electronic implementations.

As the game progresses, the plurality of players 110A-F can participate in the game play. Each player of the plurality of players 110 A-F can have an associated amount of currency 120 A-F. Moving clockwise, the first player to the left of the dealer position may be designated as small blind and, further, the first player to the left of the small blind may be designated as the big blind (e.g., player 110F is designated as the dealer position, player 110A is the small blind, and player 110B is the big blind in FIG. 1). While the big blind and small blind are determined in a clock wise manner respective of the dealer position in the above example, it is to be understood and appreciated that the small and big blinds can be determined in by other methods, such as counter-clock wise or by the amount of currency 120A-F associated with each player 11 A-F. Alternatively or additionally, antes or other forms of betting can be utilized.

Each player of the plurality of players 110A-F can have a number of pocket cards (e.g. pocket cards 140A-F in FIG. 1). The dealer may deal the pocket cards to each player, e.g., player 110 F may deal pocket cards or alternatively a non-player party (not shown) can deal the pocket cards.

Players 110A-F can use their pocket cards 140 and community cards (cards 150, 160 and 170) within a board (e.g. board 155 in FIG. 1) to form a poker hand comprising N amount of cards, wherein N is an integer. In one aspect, N is 5, in accordance with Texas Hold Em' game play. However, it is to be appreciated that N may be any integer which is not greater than the sum of the number of cards on board 155 and the number of pocket cards 140A-F dealt to an individual player of the set of players 110A-F. Alternatively or additionally, a player 110A-F may be limited to using M cards from the board 155 and K cards from a players 110A-F associated pocket cards 140A-F, wherein M and K are integers.

The board can consist of three flop cards (e.g. community cards 150 in FIG. 1), a turn card (e.g. community card 160 in FIG. 1) and a river card (e.g. community card 170 in FIG. 1). While, FIG. 1 shows specific community cards on board 155 comprising nine of spades, eight of hearts, seven of spades, two of clubs and two of diamonds, however it is to be appreciated that the community cards can be any cards in the deck and the cards shown are for exemplary purposes only.

A session 200 comprises at least one game 210-270 and may typically continue until only one player remains. At the commencement of a game, start 210, each player has an amount of currency, where such currency includes paper money, coin money, tokens, any other element capable of representing value, or a combination thereof. Further, One player is marked as the dealer position, for example, player 110 F.

At pre-deal betting round 215, pre-deal bets can be placed depending on the desired configuration, (e.g. antes, blinds, no bet, or a combination thereof). Typically, blinds are used with one player being the small blind and one player being the big blind, as previously mentioned.

At first deal round, pocket deal 220, the dealer deals two pocket cards face down to each player. In this exemplary, non-limiting embodiment, pocket cards are unique to each player. However, it is to be appreciated that non-standard decks can produce a plurality of identical pocket cards.

At first betting round 225, each player bets, where betting can be based on such considerations as pocket cards dealt at 220 and additional factors.

In a blind configuration, the first betting round comprises a first round of bets 230. The player to the left of the big blind is first to bet at 231. The betting continues at 232 until all players have called, checked, or folded. Then the betting ends at 233. It is to be appreciated that if only one player remains after the first betting round 225, then the game may be resolved at 270, with the amount of currency in the pot going to the remaining player.

At the second deal round, flop deal 235, the flop cards (e.g. community cards 150 in FIG. 1) are dealt face up and are placed on board 155.

At the second betting round 240 players place bets based upon their individual pocket cards and the three flop cards on board 155. While betting, each player also takes into consideration the other players' bets, whereby elements of braggadocio, etc., may come into play. It is to be appreciated that the second betting round 240 may not occur at all or may occur at a different point in game 300, e.g., immediately after turn deal 250.

Figure 4:
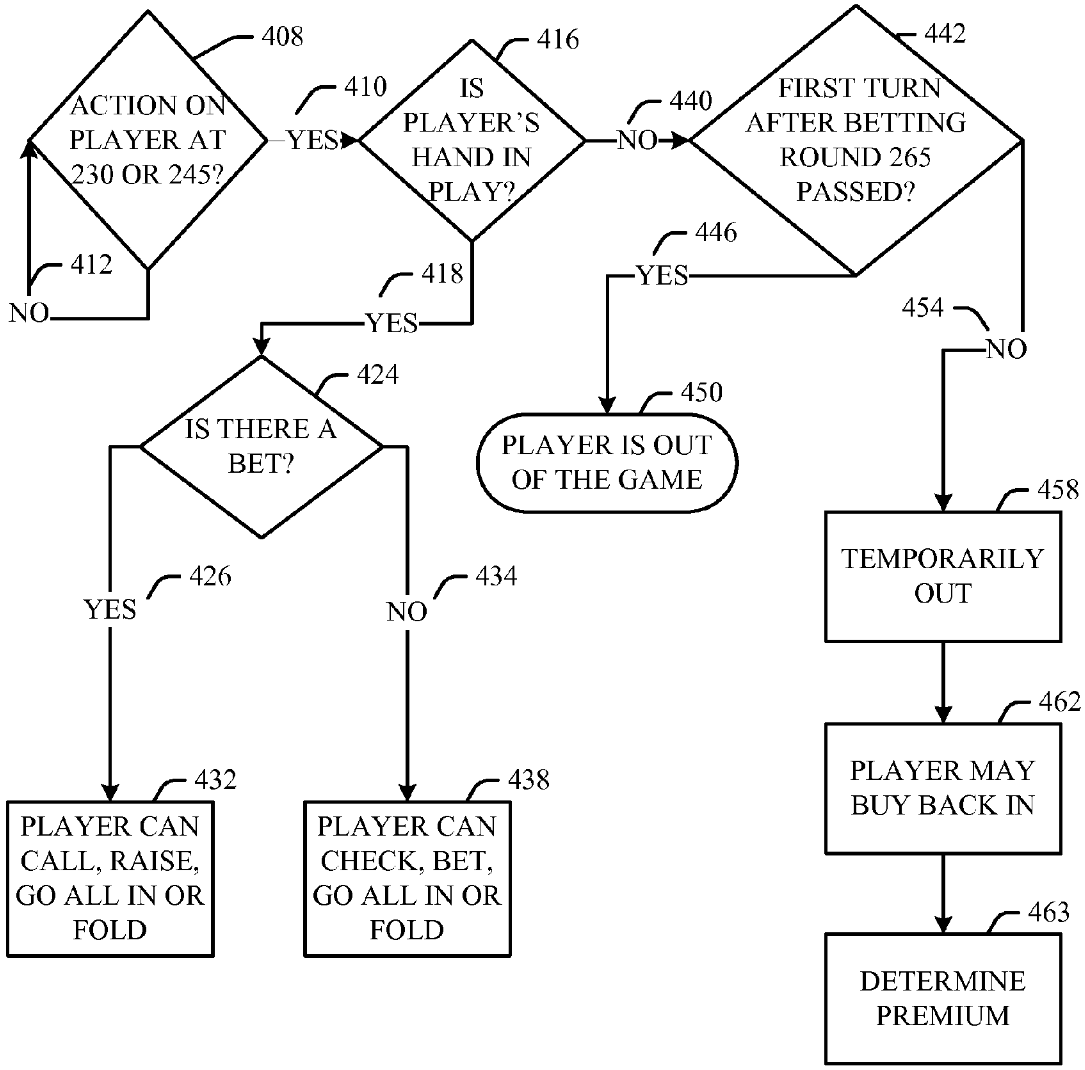
FIG. 4 is a flow diagram illustrating an exemplary, non-limiting embodiment relating to player actions.

The second betting round 240 further comprises 245, wherein the first player to the left of the dealer position (moving clockwise) can bet first at 246. Betting continues at 247 until all players have called, checked, or folded. Then betting ends at 248. It is to be appreciated that the players can bet in a different order than described above and that players' choices may be limited depending on their current status. FIG. 4, described below, provides a more detailed description of players' betting options, including a buy-back-in option.

Similar to the first betting round 225, if only one player remains in an active state after the second betting round 240, then the game may be resolved at 270, with the amount of currency in the pot going to the remaining player.

At the third deal round 250 a turn card (e.g., FIG. 1, turn card 160) is dealt face up onto board 155.

At the third betting round 255 players place bets based on their pocket cards, plus the community cards on board, as well as other factors, such as the other players' bets. It is to be appreciated that the third betting round 255 may not occur at all or may occur at a different point in game 300, e.g., immediately after flop deal 235. As in the second betting round 240, the third betting round comprises a round of bets 245, and if only one player remains, the game can be resolved at 270.

At the fourth deal round, river deal 260, a river card (e.g., FIG. 1, river card 170) is placed face up on board 155.

At the fourth betting round 265 players can place bets. The players can base their bets on their individual pocket cards, plus the cards on the board, as well as other factors. It is to be appreciated that, betting round 265 can occur at a different point in the game. As above, the fourth betting round 265 comprises round of bets 245, and if only one player remains, the game can be resolved at 270. It is also to be appreciated that additional community cards may be dealt and additional betting rounds may take place.

At resolution round 270 the pocket cards of any players (e.g., any of players 110A-110F) still in game 200/300 are exposed and a determination, according to the desired poker hand ranking scale, is made as to who the game winner(s) is. It is to be appreciated that a standard poker hand ranking scale can be used to evaluate poker hand strength, as well as other ranking scales. The game winner(s) receives the amount of currency in the pot. It is to be appreciated that a player can admit defeat without revealing their pocket cards (also known as muck the player's hand). Likewise, the pot may be split among a plurality of players, with the House, or a combination thereof.

While FIG. 1 depicts physical components in system 100, it is to be appreciated that the components may be represented as computer implement components. For example, table(s) 115 and pot 145 can be displayed on an electronic interface. Further, it can be appreciated that the design of system 100 can include different components or elements, different component placements, etc., to achieve an optimal performance, such as a non-player dealer and video monitors displaying the board 155, for example. Moreover, system 100 (and respective elements), system 200, and system 300 can be represented in an electronic environment. For example, game play and gaming objects can be recorded as computer readable instructions on a computer readable medium. The electronic environment can be comprised of any electrical circuit(s) that can include any suitable components and circuitry elements in order to implement the embodiments of the subject innovation. Furthermore, it can be appreciated that the components of system 100 can be implemented on one or more integrated circuit (IC) chips.

Turning now to FIG. 4, illustrated is an exemplary, non-limiting process flow for determining available betting options for a player, where, in accordance with various exemplary, non-limiting embodiments as discussed herein, a player may buy-back-in to a game after having previously folded their hand. FIG. 4 is to be read in combination with FIGS. 2 and 3. FIG. 4 illustrates a flow diagram for determining what decisions are available to a player during a game (e.g., game 300 in FIG. 3). By allowing a player to re-enter or buy-back-in to the game, the strategy of play can be altered significantly in comparison with conventional poker based games thereby potentially increasing the game play, as well as increasing the payout. In another aspect, by allowing a player to buy-back-in to a game, a player may take additional risks and play more hands. Unlike the gameplay of buying-back-in, as presented in FIG. 4, other poker based games do not allow players to buy-back-in or see action after a player has folded their pocket cards.

At 408 a player cannot make a decision on how to proceed until the action 408 is on them, whereby the flow continues to 410, otherwise the player waits at 412.

At 416, the player will be limited to the kind and number of decisions depending on whether the player's hand is in play. If the player's hand is in play at 418, then the number and type of decisions at 424 will depend on the current bet. If there is a current bet 426 then the player can make a decision at 432. If there is not a current bet 434 then the player can make a decision at 438.

Returning to 416, if the player's hand is not currently in play at 440 then the player must buy-back-in to the game before being able to make other decisions.

At 442 there may be, but not necessarily so, a deadline limiting when the player can buy-back-in, wherein after the deadline passes, a player cannot buy-back-in. In a non-limiting, exemplary embodiment, the deadline may pass at a point in time that corresponds with a triggering event, where, for example, the triggering event may be a point in a game, a particular card being dealt, a specific point in time (e.g., 5 o'clock), or other event. The triggering event may be determined prior to a game commencing or at commencement, for example. In the example presented, the deadline for buying back in is the first turn at the fourth betting round 265 but it is to be appreciated that the deadline can be at another predetermined point of a game.

If the deadline has passed, 446, then in view of the pre-established deadline no longer being available, the player is still out of the game, 450.

If the deadline has not passed at 454 or there is no deadline at 454, then the player is temporarily out at 458. A player who is temporarily out cannot place a bet and cannot win the game when the game is resolved. However, a player who is temporarily out may buy-back-in or pass at 462.

In another exemplary, non limiting embodiment a player may be limited to a number of buy-back-ins per game, session, tournament, betting round or combinations thereof. For example, in tournament play, players may each be limited to five buy-back-ins during each session of the tournament, and may be further limited to only one buy-back-in each game. For example, of the five buy-back-ins per session, a player can use no more than one for any particular game.

In another aspect, a premium, or re-entry amount, can be associated with a buy-back-in, such that a player must pay a premium to buy-back-in the game. The premium can be paid into the pot, a side pot, to other players, to the House, or a combination thereof. The premium can be determined at 463, for example. However, the premium can be a set amount and, thus, can be determined at or before a game commences.

Further, the premium can be any amount and can be a fixed amount or a variable amount. The premium can be associated with game information, for example, the betting rounds of a game, the games in a session, stages of a tournament, the amount of wagering currency in the pot, the amount of the bets placed in the current betting round, the amount of buy-back-ins a player has already used, the amount of players currently in the game, upon a triggering event, a combination thereof, and the like. As another example, the premium can be equal to the pot at the second betting round 240 in FIGS. 2 and 3 but it can be any amount, for example, double, triple, half, etc., the pot at the third betting round 255 in FIGS. 2 and 3.

In another aspect, the premium may be a random amount. The random amount can be determined by a die, coin flip, wheel, deck of cards, the cards on the board, an electronic component (e.g. random number generator), or any other element capable of producing a result based on chance. The random amount can be subject to a number of limits (e.g. an upper and lower limit, or a number of limits corresponding to each side of a die). The limits can be a predetermined or a variable amount and can be based on game information. Further, the amount can be determined by the occurrence of an event. For example, a lower limit can be set to the highest bet of the round and the upper limit can be the pot value. A coin can be flipped, with one side of the coin being associated with the upper limit and the other side of the coin being associated with the lower limit, the player must then pay in accordance with the coin flip. For example, FIG. 1 depicts a chance determining element, die 180.

In one exemplary, non-limiting embodiment, the premium functions as a call, e.g., the player's pocket cards are returned to play, the player does not owe any more to the pot for the current bet, and the player has not raised the current bet. It is to be appreciated that the player can pay a premium and raise the current bet by paying more than the premium, however it is also to be appreciated that a raise can be forbidden after paying the premium depending on the desired game play.

In another exemplary, non-limiting embodiment, paying the premium can count as a raise. The raise can be a set amount or dependant on the amount of other players' bets for the current betting round, the pot value, the stage of game 300, other condition, or a combination thereof.

In an exemplary, non-limiting embodiment, a player who wishes to buy-back-in cannot do so if the player cannot afford the premium. For example, if the premium is 100 tokens and the player only has 80 tokens then he cannot buy-back-in. However, in another exemplary, non-limiting embodiment, the player can buy-back-in and a side pot can be utilized for the other players.

Figure 5:
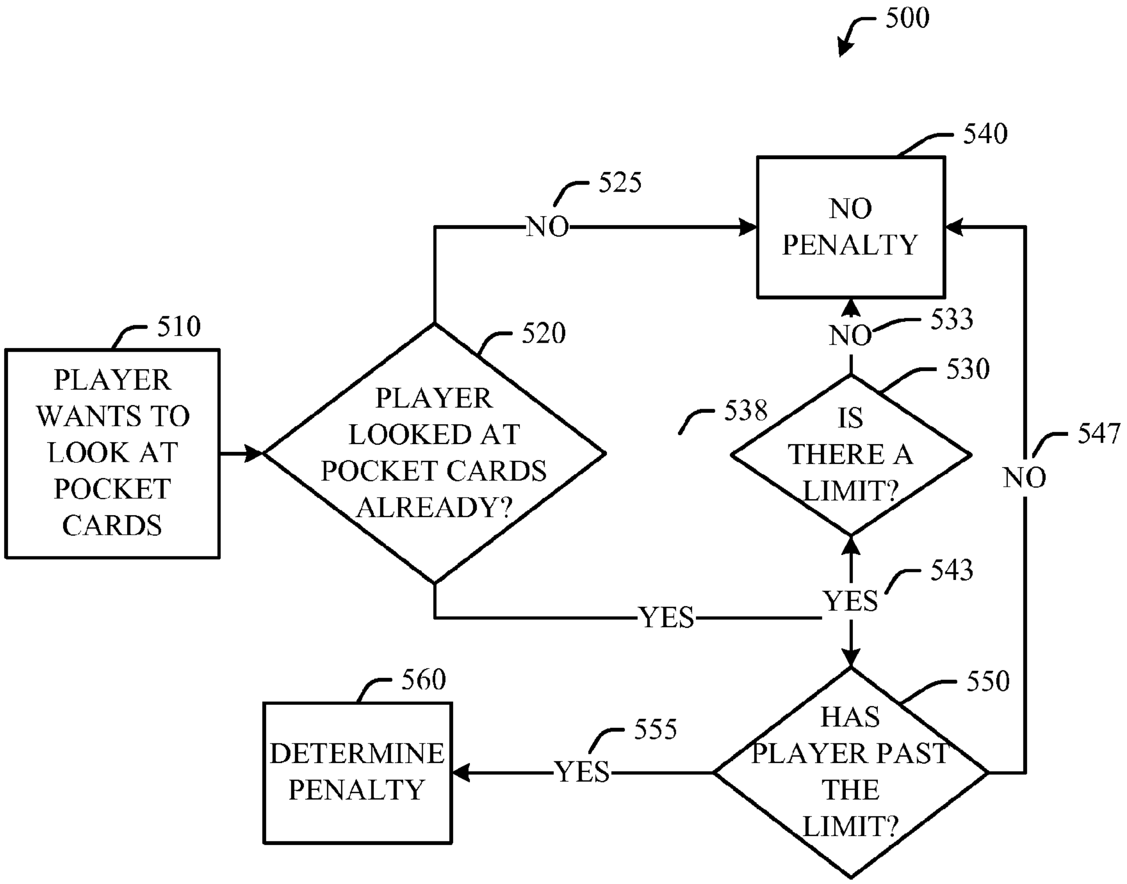
FIG. 5 is a flow diagram illustrating an exemplary, non-limiting embodiment relating to a player action of viewing cards.

Turning to FIG. 5, illustrated is a flow diagram illustrating an exemplary, non-limiting embodiment of a portion of game play. FIG. 5 is to be read in combination with FIGS. 2 and 3. At any time during a game, a player can be forbidden from viewing, or penalized if they view, their pocket cards more than a set amount of times. The set amount of times or limit can be an integer X, such that a player can look at their respective pocket cards X times. Likewise, there may be a time limit, such that players can look at their respective pocket cards for a period of length Y, for X amount of times. Y can be a real number and can be measured in a unit of time.

At 510 the player may or may not have viewed their pocket cards and the player wishes to look at their pocket cards.

At 520 a determination is made as to whether the player has previously viewed their pocket cards.

At 530 a determination is made as to whether there is a limit to the amount of times a player can look at cards.

At 540 the player is not penalized and can view their pocket cards.

At 550 a determination is made as to whether the player has or has not passed a limited.

At 560 a player who has passed the limit can be penalized or forbidden from viewing cards.

In one exemplary, non-limiting embodiment, a player is limited to one view of their pocket cards. In another exemplary, non-limiting embodiment, the limit at 530 can be variable. For example, referring to FIGS. 2 and 3, views may be unlimited at the second betting round 240 and view maybe forbidden at the third betting round 255. As another example, the player may be limited to two views at the second betting round 240 and to one view at the turn deal 250.

In a further exemplary, non-limiting embodiment, at 560 a penalty can be forfeiture of the game by the player, a forced monetary penalty to be put in the pot, forfeiture of the session or a combination thereof. For example, in a physical environment the player may have to pay the penalty into the pot, while in an electronic environment (described in various embodiments below) an online payment can occur. The penalty may be set to a constant amount or a variable amount.

In another aspect, a player can be prevented from viewing their pocket cards, e.g., in software application disabling viewing of the cards, or in a physical environment the dealer removes the cards from player access thereby preventing viewing of the cards by the player. Turning to another exemplary, non-limiting embodiment, a player may voluntarily pay a fee into the pot to view their pocket cards. The penalty or fee can be of a set amount or can be a variable amount, e.g., one dollar for an extra view at the second betting round 240 and four dollars for an extra view at the third betting round 255.

It is to be appreciated that a player can be limited from viewing all pocket cards as described above, or may be limited to viewing a number of their pocket cards, the number being less than the total number of pocket cards a player has. Further, a player can pay an amount to view a number of pocket cards, the number being less than the total amount of pocket cards.

Figure 6:
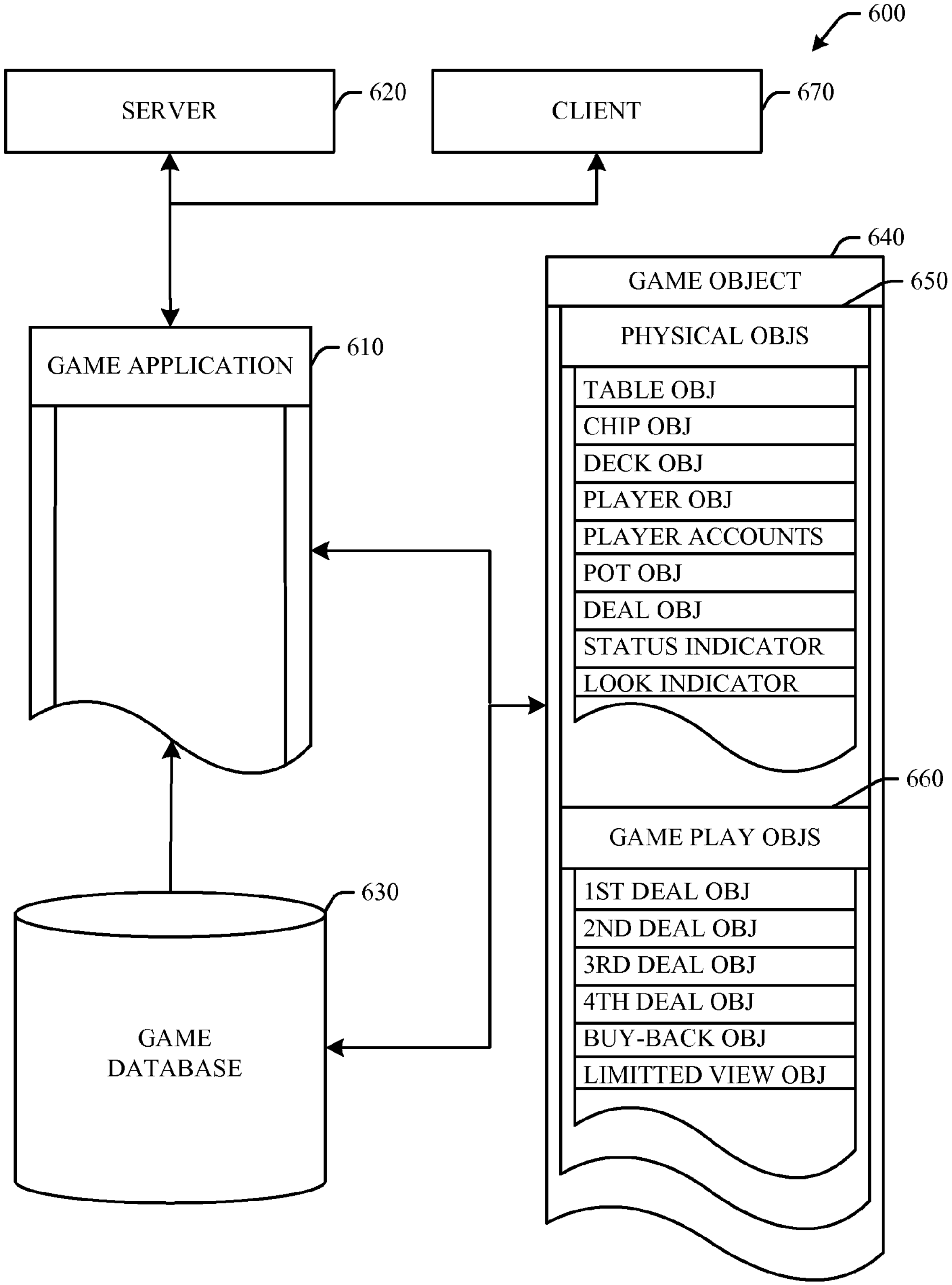
FIG. 6 is a block diagram illustrating an exemplary, non-limiting embodiment of system architecture for a community card poker game.
Figure 7:
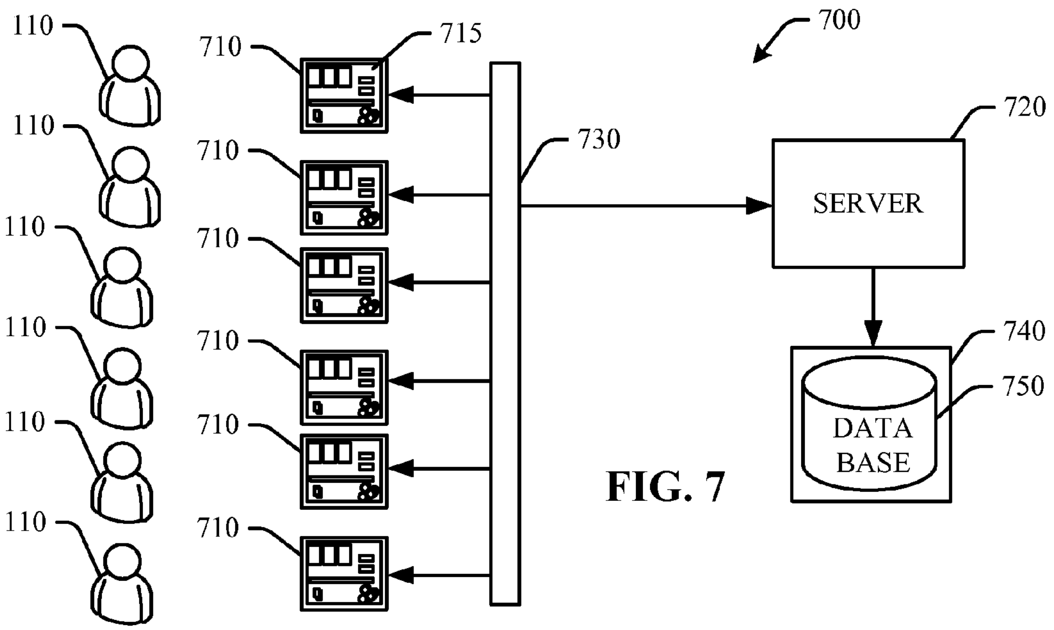
FIG. 7 is a block diagram illustrating an exemplary, non-limiting embodiment of an environment for playing a video poker game.
Figure 8:
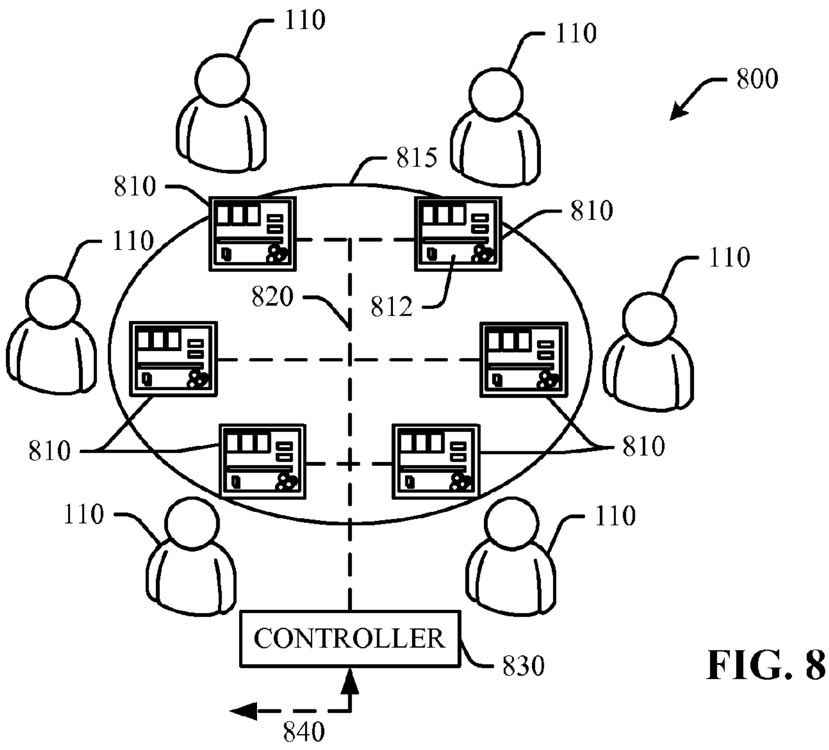
FIG. 8 is a block diagram illustrating an exemplary, non-limiting embodiment of an environment combining video poker and physical poker.
Figure 9:
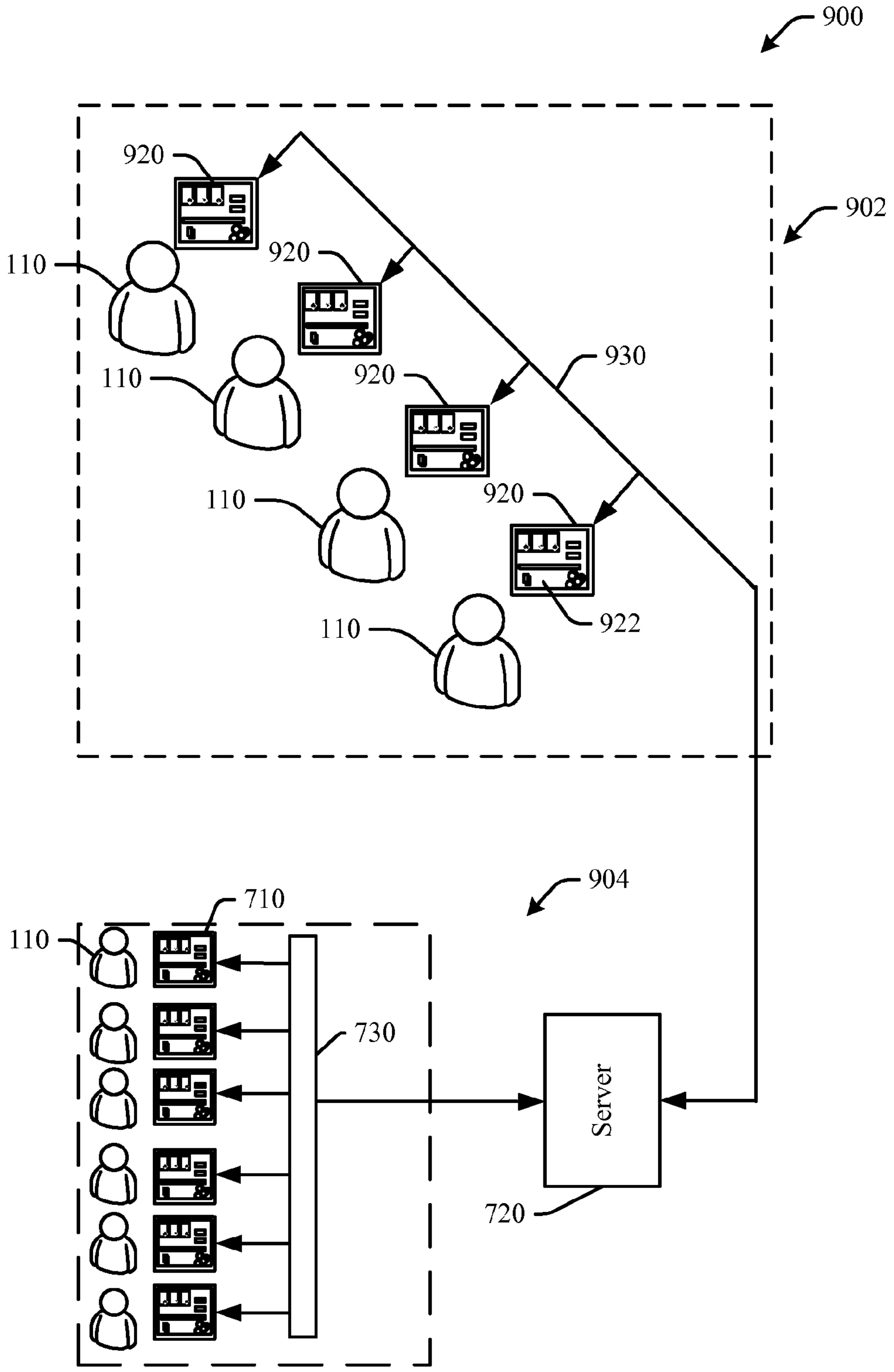
FIG. 9 is a block diagram illustrating an exemplary, non-limiting embodiment of an environment for a plurality of casino tournaments.
Figure 10:
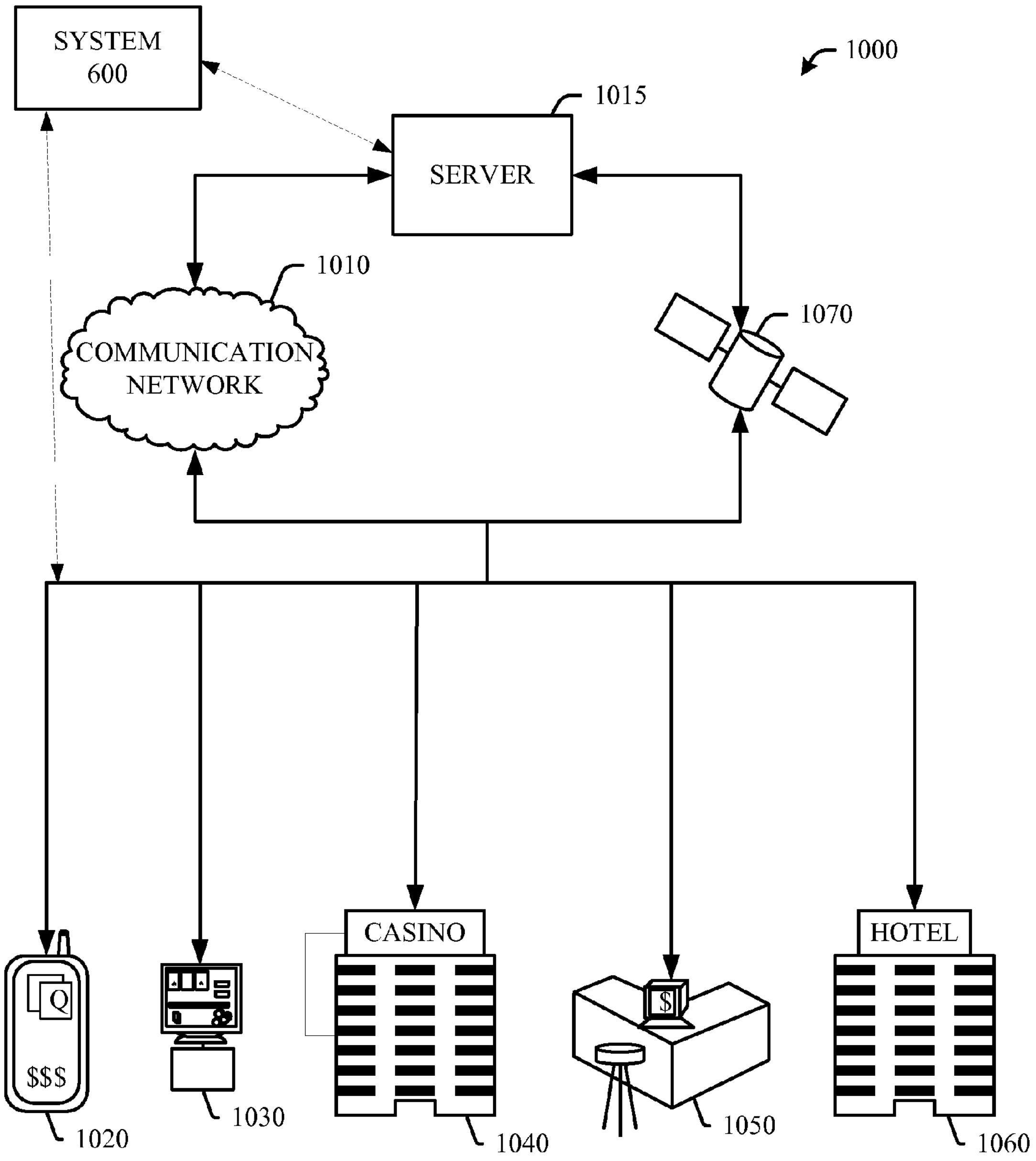
FIG. 10 is a block diagram illustrating an exemplary, non-limiting embodiment of a video poker system.

It is also to be appreciated that while system 100 is used for explaining various embodiments as presented herein, different implementations may be available depending upon the environment of play, e.g., a software game application (as depicted in FIG. 6), a video poker system(s) (as depicted in FIGS. 7 and 9), an internet-based/mobile poker system (as depicted in FIG. 10), a hybrid of software game applications and physical game applications (as depicted in FIG. 8), and the like.

While the above community card poker game can be played in a physical "real-life" environment (e.g., system 100), FIG. 6 illustrates system 600 comprising a software based implementation of a game of poker. In order to implement the poker game system 600, an exemplary, non-limiting embodiment of the game application 610 utilizes a game database 630 which holds the game objects 640. The game objects 640 are initialized and run on the game application 610 depending on the game play and the type of game being played, where a plurality of game objects 640 can be held within the game database 630. The gaming objects 640 include physical objects 650 and game play objects 660. The game play objects 660 may correlate to the previously mentioned game play in FIGS. 1, 2, 3, 4 and 5. For example, game play objects 640 can include a first deal object, correlating to pocket deal 220. The physical objects 650 can include objects such as a deck object that corresponds to a physical deck of cards 11, for example. Thus, game play objects and physical objects can be utilized by an electronic device, such as a computing device, to conduct game play in a computing environment similar to game play in a physical environment, e.g., FIG. 1.

Additionally, the software game system 600 can be played in various formats. For example, FIGS. 7-10, 12 and 13 illustrate the software game system 600 implemented via exemplary systems 700, 800, 900, 1000, 1200, and 1300.

FIG. 7 illustrates an exemplary, non-limiting embodiment based on a video poker system 700. A player 110 plays on an electronic gaming client 710, where the electronic gaming client can be any suitable device facilitating execution of the game, for example, a computer, a computer terminal, and the like. The gaming clients 710 can be in disparate locations or can be within a common location. The gaming client 710 can be operable to receive input from players 110, via an interface, such as a graphical user interface 715. It is to be noted that while the first instance of gaming client 710 is shown having an interface 715, the other instances of gaming clients similarly include an interface (e.g., interface 715) to facilitate interaction between a player (e.g., any of players 110), gaming client 710 and server 720.

Likewise, the gaming client 710 can display gaming information via the interface 715. Gaming information displayed can include objects corresponding to the above physical systems, such as players balance, pocket cards, and community cards, for example. The gaming client 710 may be connected to a server(s) 720 via a bus 730. The server(s) 720 can also be hardware and/or software (e.g., threads, processes, computing devices). The server(s) 720 can utilize any of a plurality of applications/software to facilitate operation of any of the various embodiments presented herein. Communication between a gaming client 710 and a server(s) 720 can be in any suitable form, such as a data packet adapted to be transmitted between two or more computer processes. The data packet can include a cookie and/or associated contextual information, for example, as required to facilitate operation and gameplay of system 700. The video poker system 700 can be operable to communicate any required information pertaining to playing a game of poker, session of poker, etc. Pertinent information can include, for example, payment(s) made by a player, payment(s) received by a player, card selection, game play history, account information, and the like. Server(s) 720 can store any required software to facilitate operation of the various embodiments presented herein, and accordingly server(s) 720 can operate as a controller device, controlling operation of the various client(s) 710.

Further, it can be appreciated that the design of system 700 can include different component selections, component placements, etc., to achieve an optimal performance, such as portable gaming units, for example. Moreover, the system 700 and gaming clients 710 can include any electrical circuit (s), components and circuitry elements to implement the embodiments of the subject innovation. Furthermore, software, software threads, and computer readable information can be contained in memory, wherein eh memory can be volatile or non-volatile (such as flash memory). Memory can be contained in each client 710 (not shown) or associated with server(s) 720, such as memory 740 and database 750. It is to be appreciated that memory/database can be associated with client(s) 710 and server(s) 720 in any suitable configuration as required to facilitate operation of the various embodiments presented herein. It is to be appreciated that while a plurality of players 110 are shown interacting with client(s) 710 any of the player(s) 110 can be a computer generated player. For example, five of players 110 are physical human entities while a sixth player is a computer generated player and is included, for example, to round the number of hands to six.

FIG. 8 illustrates system 800, an exemplary, non-limiting embodiment comprising aspects of video poker and physical poker. As illustrated, players 110 can interact with a gaming client 810 while at a poker table 815. The gaming client 810 can be a monitor or other electronic device and can receive input from users via an interface (e.g., interface 812) and display gaming information via the interface. A gaming client 810 can connect to another client(s) (e.g., other clients 810) and receive input via a bus 820 connected to a controller 830. The controller 830 can be operable to facilitate the communications and game play. It is to be appreciated that more than one bus may be used, and a single bus 820 is shown for simplicity. Further, the controller 830 can be an electronic computing device, such as a computer or server, having stored thereon (e.g., in a memory, not shown) software components to facilitate operation of the various aspects presented herein. Likewise, the system 800 can be connected, via communication path 840, to other electronic systems (or combinations of electronic and physical systems) through one or more server (s), thereby enabling a plurality of systems 800 to interact/communicate with each other. Communication path 840 can be of any suitable means required to facilitate connection/communication of a plurality of systems, such as intranet, internet, cellular network, and the like.

Further, it can be appreciated that the design of system 800 can include different component selections, component placements, etc., as required to facilitate operation, such as portable gaming units, for example. Moreover, the system 800 and gaming client 810 can include any components and circuitry as required to implement the various embodiments as presented herein. Furthermore, software, software threads and other computer readable information can be stored in memory, (volatile or non-volatile, such as flash), wherein the memory can be contained in each client 810 or in controller 830, as required.

FIG. 9 illustrates system 900, an exemplary, non-limiting embodiment enabling, various modes of play in accord with various aspects and embodiments presented herein. FIG. 9 illustrates a video poker subsystem 904 (similar in configuration and operation to system 700, and similar components are marked) and subsystem 902 for a player versus the House type of operation.

The player versus the House system 902 comprises a plurality of gaming devices 920 connected to the server 720 of system 904, through a bus 930, for example. The gaming devices 920 can be an electronic computing device, such as a computer or gaming kiosk. The gaming device(s) 920 can be further operable to receive input from players 110, via an interface 922. Likewise, the gaming device(s) 920 may display gaming information, via the interface 922. The players 110 can compete against the House to achieve the best possible hand, as required to win the game. In addition, the gaming device 920 can facilitate game play, with computer generated competitors (as described with reference to system 700). It is to be understood that any number of clients, servers, etc. can be utilized to facilitate game play.

The system 902 may be local or remote to the server 720. Likewise, gaming devices 920 can be connected to servers other than server 720. Additionally or alternatively, a common server can be utilized by a plurality of systems similar in kind to systems 902 and 904.

Turning to FIG. 10, illustrated is an exemplary, non-limiting embodiment of game play through a network system 1000. In one aspect, system 600 can be implemented on system 600, through the use of the communication network 1010 where the game application 610 is hosted on the server (s) 1015. However, game application 610 can be hosted on a client computing device, such as personal computer 1030, for example.

To operate the game application 610, one exemplary, non-limiting embodiment enables a plurality of client applications to run resident copies of the game application 610 and play in a networked system 1000. This can be accomplished through the use of wireless communications 1070 (e.g. cellular communication networks) connecting the server 1015 to any suitable gaming components, where the gaming components can include any of PDAs and cell phones 1020, personal computers 1030, or bar top consoles 1050. Where the suitable gaming components can be located at a casino 1040, or a hotel 1060, and the like. Further, a communication network 1010, e.g., internet, intranet and the like, can be utilized to facilitate operation of the various embodiments presented herein. Likewise, stand alone systems can be implemented that do not connect to the internet, e.g., hand held devices (e.g., PDA's 1020), counter top gaming machines (e.g., 1050), and other computers, (e.g., 1030), not necessarily connected to the communication network 1010. It is to be appreciated, that stand alone machines can be connected to the communication network 1010 but not necessarily so.

It is to be appreciated that any of the components comprising systems 100, 600, 700, 800, 900, 1000, 1200, or 1300 can be associated with any organization offering execution of card games in a digital environment. Such organizations include casino, online casino, online sports betting, mobile gambling, hotel, cruiseship, bar, internet gambling organization, and any other entity provisioning components, in the form of hardware, software, or combination thereof, facilitating the operation of any of the various embodiments presented herein.

Figure 11A:
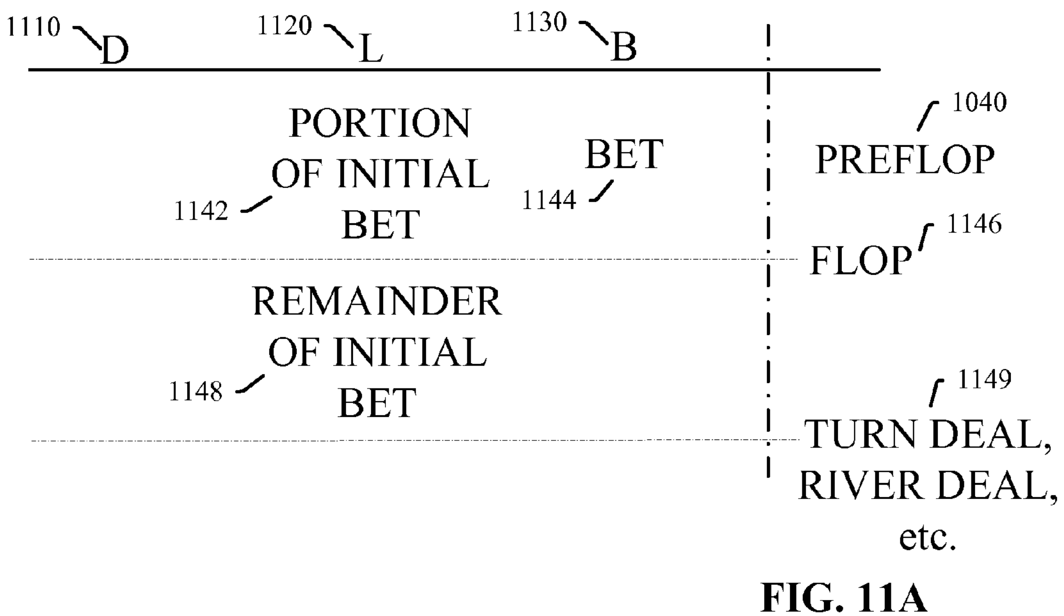
FIG. 11A is a conceptual diagram illustrating an exemplary, non-limiting embodiment regarding sequence of play.
Figure 11B:
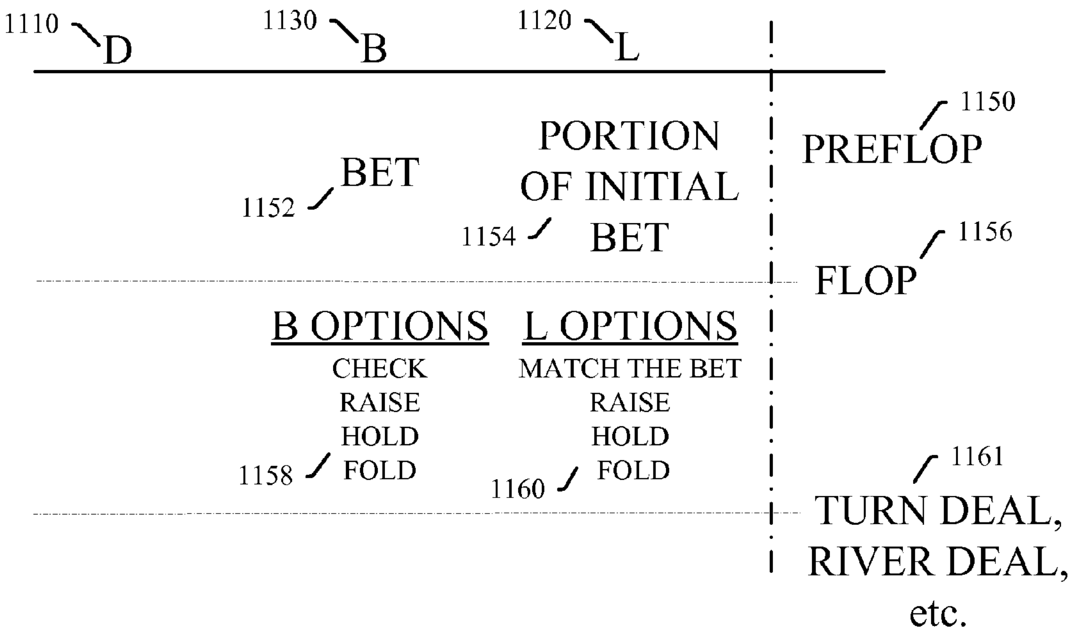
FIG. 11B is a conceptual diagram illustrating an exemplary, non-limiting embodiment regarding sequence of play.

It is to be appreciated that while various embodiments presented herein relate to a dealer→small blind→big blind sequence, (e.g., any of FIGS. 1-6) the sequence can be reversed whereby the first player to the left of the dealer is the big blind and the person to the left of the big blind is a small blind and the sequence becomes dealer→small blind→big blind. With conventional game play the little blind, after the flop, has to make up the deficit between the amount of the little blind and the big blind. With the embodiment presented herein of the little blind has an option to fold (or "hold") without having to match the big blind amount. FIGS. 11A and 11B illustrates various exemplary, non-limiting embodiments based upon the concept of the big blind, little blind sequence. FIG. 11A presents a dealer D 1110, little blind L 1120 and big blind D 1130. During the preflop 1040 stage, little blind 1120 can bet a portion 1142 of the bet 1144 that will be made by the big blind 1130. Typically bet portion 1142 is half of bet 1144, but can be of any amount with respect to the value of the bet 1144. The other players (e.g., FIG. 1, players 110C-E) can place their bets, etc., as the preflop round progresses. After the flop 1146, if the little blind 1120 wishes to remain in the game they must then at least make up the difference between the bet amount 1144 and the portion of bet 1142, the remainder 1148. For example, if bet 1144 is to be $100, then the bet portion 1142 made by little blind 1120 can be $50. Hence, after the flop 1146, little blind 1120 must bet 1148 at least the difference between the bet 1144 and portion 1142, hence in this example, the remainder is $50. The other players (e.g., FIG. 1, players 110C-E) can place their bets, etc., as the flop round progresses, and the game proceeds 1149 to the turn deal (e.g., FIG. 3, turn deal 250), river deal (e.g., FIG. 3, river deal 260), etc.

Turning to FIG. 11B, in comparison with the sequence presented in FIG. 11A, the betting sequence is big blind 1130 followed by little blind 1120. Hence, during the preflop 1150 round, the big blind 1130 makes a bet 1152, followed by little blind 1120 making a bet 1154 which is a portion of the bet 1152 (e.g., portion bet 1154 is half of the amount of the bet 1152). The other players (e.g., FIG. 1, players 110C-E) can place their bets, etc., as the preflop round progresses. After the flop 1156, big blind 1130 has a number of options 1158 available to them. Owing to the big blind 1130 having already made a preflop bet 1152, big blind 1130 can opt to check the betting. Alternatively big blind 1130 can opt to raise the bet. A further option is to fold their hand and partake in the game no more. Alternatively, big blind 1130 can opt to "hold" their hand, whereby big blind 1130 is indicating that they do not wish to partake in this round but are "holding" their hand with the option to buy-back-in to the game at a later round, if they desire, where the action of buying-back-in is in accord with any of the various embodiments as presented herein and in association with the action of buying-back-in (e.g., as presented in FIG. 4).

After big blind 1130 has made their option (e.g., any of check, raise, hold, fold, etc.) the little blind 1120 has a number of options 1160 available to them. Options include matching the bet, raising the bet, holding or folding. If little blind 1120 chooses to either match or raise the bet then they must, in the event of matching the bet make up the difference in the amount between bet 1152 and portion of bet 1154, or in the event of raising the bet make up the difference in the amount between bet 1152 and portion of bet 1152 as well as an amount to raise the bet. Alternatively, based on such considerations as the bet 1152 (or raise 1158) made by big blind 1130, the flop cards (e.g., FIG. 1, cards 150), the pocket cards (e.g., FIG. 1, cards 140), etc., little blind 1120 may choose to fold. For example, if bet 1152 is to be $100, then the bet portion 1154 made by little blind 1120 can be $50. Hence, after the flop 1156, little blind 1120 must bet 1160 at least the difference between the bet 1152 and portion 1154, hence in this example, the remainder is $50. A further option available to little blind 1120 is to "hold" their hand, whereby little blind 1120 is indicating that they do not wish to partake in this round but are "holding" their hand with the option to buy-back-in to the game at a later round, if they desire, where the action of buying-back-in is in accord with any of the various embodiments as presented herein and in association with the action of buying-back-in (e.g., as presented in FIG. 4). Hence, by going after the big blind 1130, little blind 1120 can opt to sit out this round (e.g., hold or fold) while only having bet the bet portion 1154. The other players (e.g., FIG. 1, players 110C-E) can place their bets, etc., as the flop round progresses, and the game proceeds 1161 to the turn deal (e.g., FIG. 3, turn deal 250), river deal (e.g., FIG. 3, river deal 260), etc. In a further non-limiting exemplary embodiment if little blind 1120 decides that they wish to buy-back-into the game after they have held/folded prior to the flop, little blind 1120 must make up the difference between the bet 1152 and the bet portion 1154 along with the required amount to buy-back-in to the game. Continuing the previous example above, little blind 1120 will have to include the $50 difference between the bet 1152 and bet portion 1154 along with the required amount to buy-back in (e.g., the amount of FIG. 4, acts 462 and 463).

The other players (e.g., FIG. 1, players 110C-E) can place their bets, etc., as the flop round progresses, and the game proceeds 1149 to the turn deal (e.g., FIG. 3, turn deal 250), river deal (e.g., FIG. 3, river deal 260), etc.

Figure 12:
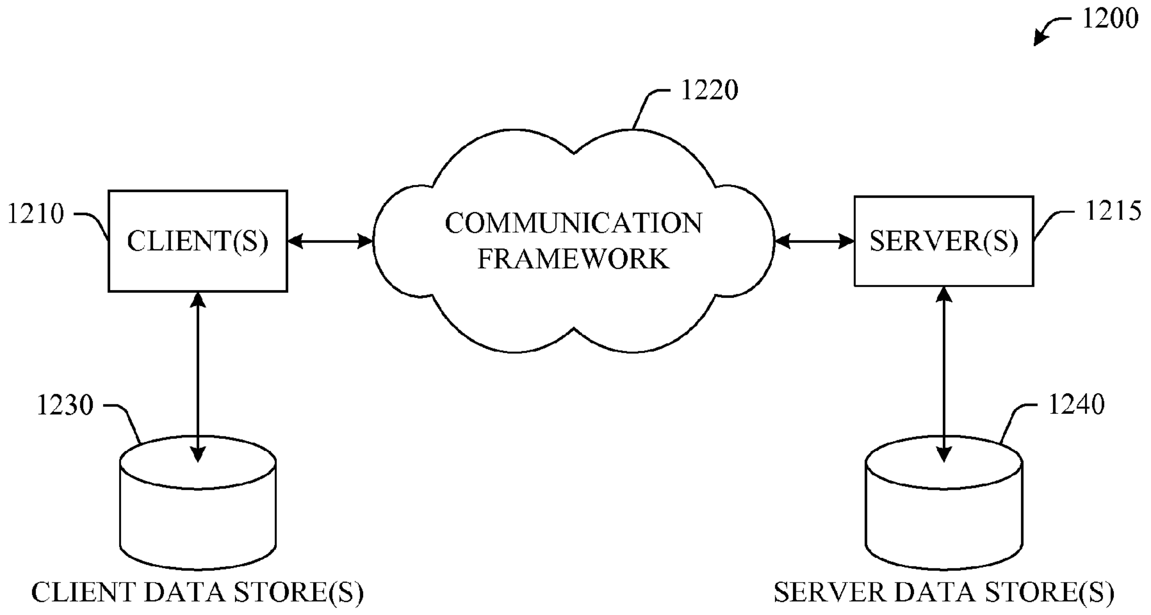
FIG. 12 is a block diagram illustrating an exemplary, non-limiting embodiment of a computer operable to execute the disclosed architecture.

Referring now to FIG. 12, there is illustrated a schematic block diagram of a computing environment 1200 in accordance with the subject specification. The system 1200 includes one or more client(s) 1210. The client(s) 1210 can be hardware and/or software (e.g., threads, processes, computing devices). The client(s) 1210 can house cookie(s) and/or associated contextual information by employing the specification, for example.

The system 1200 also includes one or more server(s) 1215. The server(s) 1215 can also be hardware and/or software (e.g., threads, processes, computing devices). The servers 1215 can house threads to perform transformations by employing the specification, for example. One possible communication between a client 1210 and a server 1215 can be in the form of a data packet adapted to be transmitted between two or more computer processes. The data packet can include a cookie and/or associated contextual information, for example. The system 1200 includes a communication framework 1220 (e.g., a global communication network such as the Internet) that can be employed to facilitate communications between the client(s) 1215 and the server(s) 1210.

Communications can be facilitated via a wired (including optical fiber) and/or wireless technology. The client(s) 1210 are operatively connected to one or more client data store(s) 1230 that can be employed to store information local to the client(s) 1210 (e.g., cookie(s) and/or associated contextual information). Similarly, the server(s) 1215 are operatively connected to one or more server data store(s) 1240 that can be employed to store information local to the servers 1215.

Figure 13:
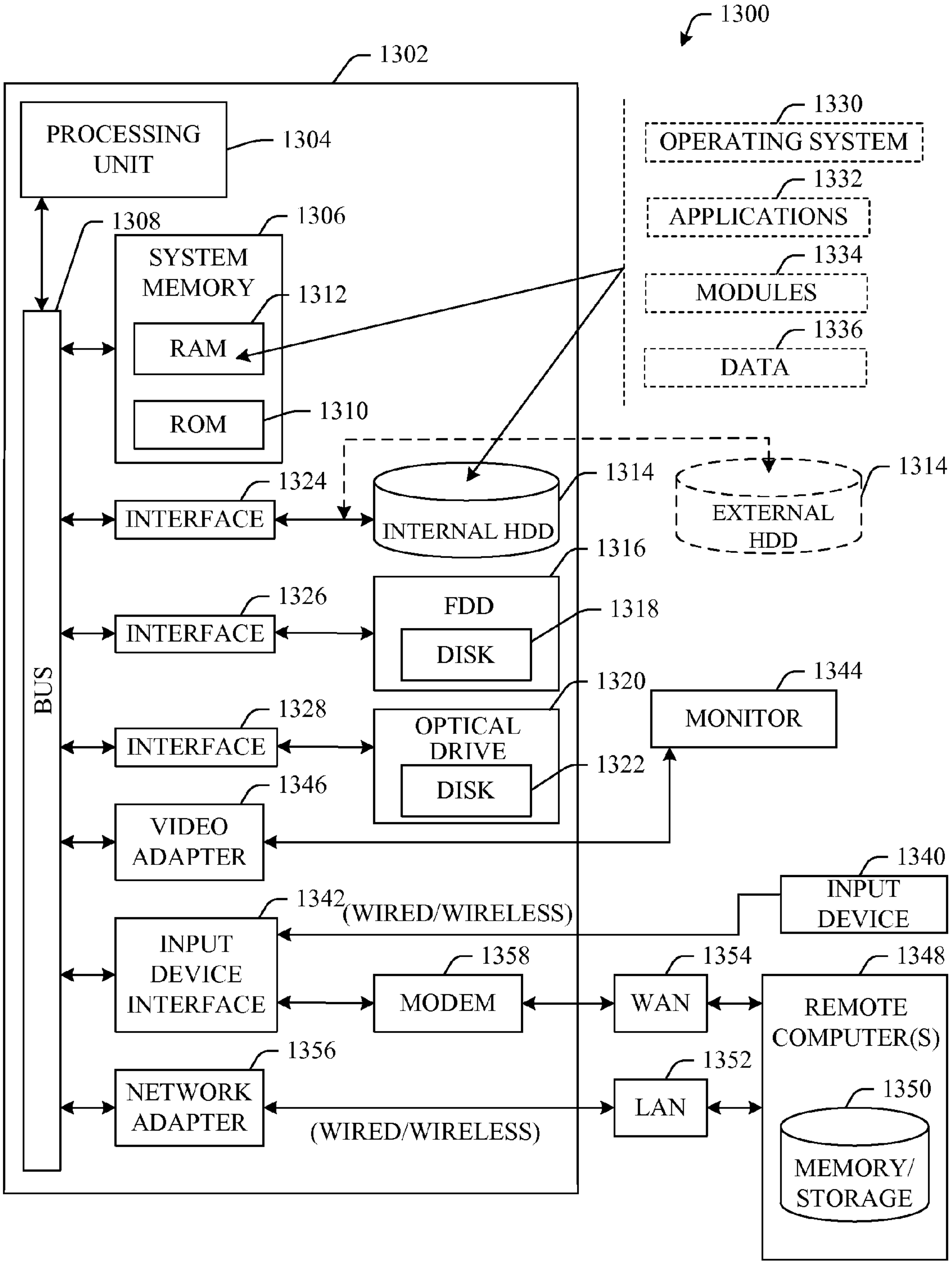
FIG. 13 is a block diagram illustrating an exemplary, non-limiting embodiment of a computing environment in accordance with the subject specification.

Referring now to FIG. 13, there is illustrated a block diagram of a computer operable to execute the disclosed architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of their characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 13, the example environment 1300 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors or proprietary specific configured processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 can further include an internal hard disk drive (HDD) 1314 (e.g., EIDE, SATA), which internal hard disk drive 1314 can also be configured for external use in a suitable chassis (not shown), or can also be a suitable substitute, such as a solid state drive (SDD) as common in hand held and portable devices (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1312, including an operating system 1330, one or more application programs 932, other program modules 1334 and program data 1336. All or portions of the operating system, applications, modules, and/or data can also be cached in the RAM 1312. It is appreciated that the specification can be implemented with various proprietary or commercially available operating systems or combinations of operating systems.

A user can enter commands and information into the computer 1302 through one or more wired/wireless input devices 1340, e.g., input devices can include (not shown) a keyboard, a pointing device, such as a mouse, a microphone, an IR remote control, a joystick, a game pad, a stylus pen, touch screen, motion recognition device, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the input device interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices. In additions, other wireless communication systems, such as mobile broadband in cellular phones, can be used to connect to the Internet.

For purposes of simplicity of explanation, methodologies that can be implemented in accordance with the various aspects disclosed herein were shown and described as a series of blocks. However, it is to be understood and appreciated that the various aspects disclosed herein are not limited by the order of the blocks, as some blocks can occur in different orders and/or concurrently with other blocks from what is depicted and described herein. Moreover, not all illustrated blocks are required to implement the methodologies described supra. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components may be combined into a single component providing aggregate functionality. The components may also interact with one or more other components not specifically described herein but known by those of skill in the art.

Furthermore, the various aspects as presented herein can be implemented as a method, apparatus, or article of manufacture using standard programming and/or engineering techniques to produce software, firmware, hardware, or any combination thereof to control a computer to implement the various disclosed aspects. The term "article of manufacture" as used herein is intended to encompass a computer program accessible from any computer-readable device, carrier, or media. For example, non-transitory computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the claimed subject matter.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of playing a community card type poker game, the method comprising:

dealing, by a system comprising a processor at least one player card to each player in a group of players playing the community card poker game, wherein the group of players comprises at least a first player;

dealing, by the system, a community card;

facilitating, by the system, a first round of betting;

detecting, by the system, during the first round of betting, the first player folding their at least one player card;

dealing, by the system, another community card;

detecting, by a system, after the first round of betting, a request by the first player to resume participation in the game with their folded at least one player card;

facilitating, by the system, a second round of betting;

enabling, by the system, the first player to unfold their at least one player card and resume participation in the game with their at least one player card; and resolving, by the system, a winner of the game in accordance with predetermined rules regarding the combination of cards comprising each player's hand, wherein each player's hand comprising their at least one player card and the community cards.

2. The method of claim 1, wherein the community card poker game is Texas Hold'em.

3. The method of claim 1, wherein the enabling the first player to unfold their at least one player card further comprising determining, by the system, the first player buying-back-in for an amount of currency.

4. The method of claim 3, wherein the amount of currency for buying-back-in is at least one of a fixed amount of currency, a random amount of currency, a previously agreed amount of currency, or an amount of currency based upon a current round of betting in the game.

5. The method of claim 1, further comprising limiting, by the system, a number of times the first player can resume participation the game.

6. The method of claim 1, further comprising establishing, by the system, a period of time in the game at which resuming participation in the game by the first player can occur.

7. The method of claim 6, further comprising, in the event of the period of time expiring, the first player cannot resume participation in the game.

8. The method of claim 6, wherein the establishing of the period of time further comprising establishing, by the system, a triggering event for the period of time.

9. The method of claim 1, wherein at least one of the first round of betting or the second round of betting progresses from big blind to little blind.

10. A system for playing a community card poker game, comprising:

a non-transitory computer-readable storage medium comprising computer executable instructions that, in response to execution by a computing system, cause the computing system to perform operations comprising:

dealing at least one player card to each player in a group of players;

dealing a community card;

facilitating a first round of betting;

detecting, during the first round of betting, a player folding;

dealing another community card;

detecting, after the first round of betting, a request by the folded player to resume participation in the game;

facilitating a second round of betting;

enabling the folded player to unfold their at least one player card and resume participation in the game with their at least one player card; and resolving a winner of the game in accordance with predetermined rules regarding the combination of cards comprising each player's hand, wherein each player's hand comprising their at least one player card and the community cards.

11. The system of claim 10, wherein the computing system comprises at least one of a server, a mobile computing device, a client computer, a personal computer, or a console.

12. The system of claim 11, wherein the computing system further comprises a user interface to facilitate interaction with the computing system.

13. The system of claim 10, the operations further comprising enabling the folded player to resume participation in the game by buying-back-in for an amount of currency.

14. The system of claim 13, wherein the amount of currency for buying-back-in is at least one of a fixed amount of currency, a random amount of currency, a previously agreed amount of currency, or an amount of currency based upon a current round of betting in the game.

15. The system of claim 10, the operations further comprising limiting a number of times the folded player can re-enter the game.

16. The system of claim 10, the operations further comprising establishing a period of time in the game at which re-entering the game by the folded player can occur.

17. The system of claim 16, the operations further comprising establishing a triggering event for the period of time.

18. A system comprising:

a memory to store computer-executable instructions; and a processor, communicatively coupled to the memory, that facilitates execution of the computer-executable instructions to perform operations relating to playing a community card poker game, the operations comprising:

dealing at least one player card to each player in a group of players;

dealing a community card;

facilitate a first round of betting;

detecting, during the first round of betting, a player folding;

dealing another community card;

detecting, after the first round of betting, a request by the folded player to resume participation in the game;

facilitating a second round of betting;

enabling the folded player to unfold their at least one player card and resume participation in the game with their at least one player card; and resolving a winner of the game in accordance with predetermined rules regarding the combination of cards comprising each player's hand, wherein each player's hand comprising their at least one player card and the community cards.

19. The system of claim 18, further comprising assessing a levy against the folded player to facilitate the folded player buying-back-in to the game.

20. The system of claim 18, further comprising limiting a number of times the folded player can re-enter the game.

* * * * *